United States Patent
Shaffer et al.

(10) Patent No.: US 8,036,375 B2
(45) Date of Patent: Oct. 11, 2011

(54) AUTOMATED NEAR-END DISTORTION DETECTION FOR VOICE COMMUNICATION SYSTEMS

(75) Inventors: Shmuel Shaffer, Palo Alto, CA (US); James C. Frauenthal, Colts Neck, NJ (US); Michael P. O'Brien, Manasquan, NJ (US)

(73) Assignee: Cisco Technology, Inc., San Jose, CA (US)

( * ) Notice: Subject to any disclaimer, the term of this patent is extended or adjusted under 35 U.S.C. 154(b) by 1110 days.

(21) Appl. No.: 11/828,589

(22) Filed: Jul. 26, 2007

(65) Prior Publication Data

US 2009/0030693 A1    Jan. 29, 2009

(51) Int. Cl.
*H04M 1/00* (2006.01)

(52) U.S. Cl. .............. 379/388.02; 704/201; 381/56

(58) Field of Classification Search .............. 704/234, 704/275; 709/200, 232–235; 370/229, 231
See application file for complete search history.

(56) References Cited

U.S. PATENT DOCUMENTS

| | | | |
|---|---|---|---|
| 7,003,099 B1 * | 2/2006 | Zhang et al. | 379/406.03 |
| 7,668,968 B1 * | 2/2010 | Smith | 709/234 |
| 2004/0022394 A1 * | 2/2004 | Michaelis | 381/66 |
| 2005/0203749 A1 * | 9/2005 | Miyata | 704/275 |
| 2006/0020697 A1 | 1/2006 | Kelso et al. | |
| 2006/0067540 A1 * | 3/2006 | Gao et al. | 381/92 |
| 2006/0069557 A1 * | 3/2006 | Barker et al. | 704/234 |
| 2006/0073786 A1 | 4/2006 | Sarkar | |
| 2006/0136544 A1 * | 6/2006 | Atsmon et al. | 709/200 |
| 2008/0101557 A1 * | 5/2008 | Boss et al. | 379/88.08 |
| 2008/0167868 A1 * | 7/2008 | Kanevsky et al. | 704/233 |
| 2008/0170712 A1 * | 7/2008 | Somasundaram et al. | 381/77 |

FOREIGN PATENT DOCUMENTS

| | | |
|---|---|---|
| CN | 101766014 | 6/2010 |
| EP | 1672898 A | 6/2006 |
| EP | 2171994 A | 7/2010 |
| WO | WO2009/014938 | 1/2009 |

OTHER PUBLICATIONS

EPO Communication pursuant to Article 94(3) EPC mailed Aug. 24, 2010 regarding Application No. 08772550.3-2414; 6 pages.
PCT International Search Report mailed Oct. 31, 2008 for PCT/US200S/070063; 2 pages.
PCT International Preliminary Report on Patentability and Written Opinion of the International Searching Authority mailed Jan. 25, 2010 for PCT/US2008/070063; 7 pages. Series P: Telephone Transmission Quality, Telephone Installations, Local Line Networks, Objective Measuring Apparatus, 67 pages, May 2004, ITU-T p. 563, Telecommunication Standardization Sector of ITU.
Malfait, Ludovic, et al., "p. 563-The ITU-T Standard for Single-Ended Speech Quality Assessment" 11 pages, IEEE Transactions on Audio, Speech and Language Processing, vol. 14, No. 6, Nov. 2006.
Response to EPO Communication dated Feb. 28, 2011, in response to EPO Communication pursuant to Article 94(3) EPC regarding Application No. 08772550.3-2414; 19 pages.
EPD Communication dated May 30, 2011 from EP Application Serial No. 08772550; 5 pages.

* cited by examiner

*Primary Examiner* — Fan Tsang
*Assistant Examiner* — Jeffrey Lytle
(74) *Attorney, Agent, or Firm* — Patent Capital Group

(57) ABSTRACT

In one embodiment, a method for providing voice quality assurance is provided. The method determines voice information for an end point in a voice communication system. The voice information may be from an ingress microphone. The method determines if the voice quality is considered degraded based on an analysis of the voice information. For example, the voice information may indicate that it is distorted, too loud, too soft, is subject to an external noise, etc. Feedback information is determined if the voice quality is considered degraded where the feedback information designed to improve voice quality at an ingress point for a user speaking. The feedback information is then outputted at the end point to the user using the end point.

25 Claims, 4 Drawing Sheets

AUTOMATED NEAR-END DISTORTION DETECTION FOR VOICE COMMUNICATION SYSTEMS

TECHNICAL FIELD

Particular embodiments generally relate to voice communication systems.

BACKGROUND

Voice communication systems, such as traditional public switched telephone network (PSTN) telephone systems, cellular telephone systems, and land mobile radio systems, can experience voice degradation caused by microphone distortion. In a specific example, a push-to-talk (PTT) communication system may be used by emergency response personnel to communicate amongst each other. These users work in physically and emotionally stressful conditions, such as in burning buildings, volatile crime scenes, etc., and are often under personal threat or performing aerobic physical exertion. One consequence of the stressful use is that voices may be distorted to the point of unintelligibility because of actions by the users. For example, users may hold the microphone too close to the mouth, which may produce too much breath noise or too much acoustic pressure for a proper voice transmission. Further, users may speak too softly or too loudly because of the situation they are in, such as a user may not be able to speak loudly because they are in danger or the user may be excited and speak too loudly. This often results in distortion and other users listening to the speaker cannot understand what the speaker is saying. Often, the communications from the speaker may be critical and thus it is important that users understand the speaker.

DESCRIPTION OF EXAMPLE EMBODIMENTS

Overview

In one embodiment, a method for providing voice quality assurance is provided. The method determines voice information for an end point in a voice communication system. The voice information may be from an ingress microphone. The method determines if the voice quality is considered degraded based on an analysis of the voice information. For example, the voice information may indicate that it is distorted, too loud, too soft, is subject to an external noise, etc. Feedback information is determined if the voice quality is considered degraded where the feedback information designed to improve voice quality at an ingress point for a user speaking. The feedback information is then outputted at the end point to the user using the end point.

Example Embodiments

Figure 1:
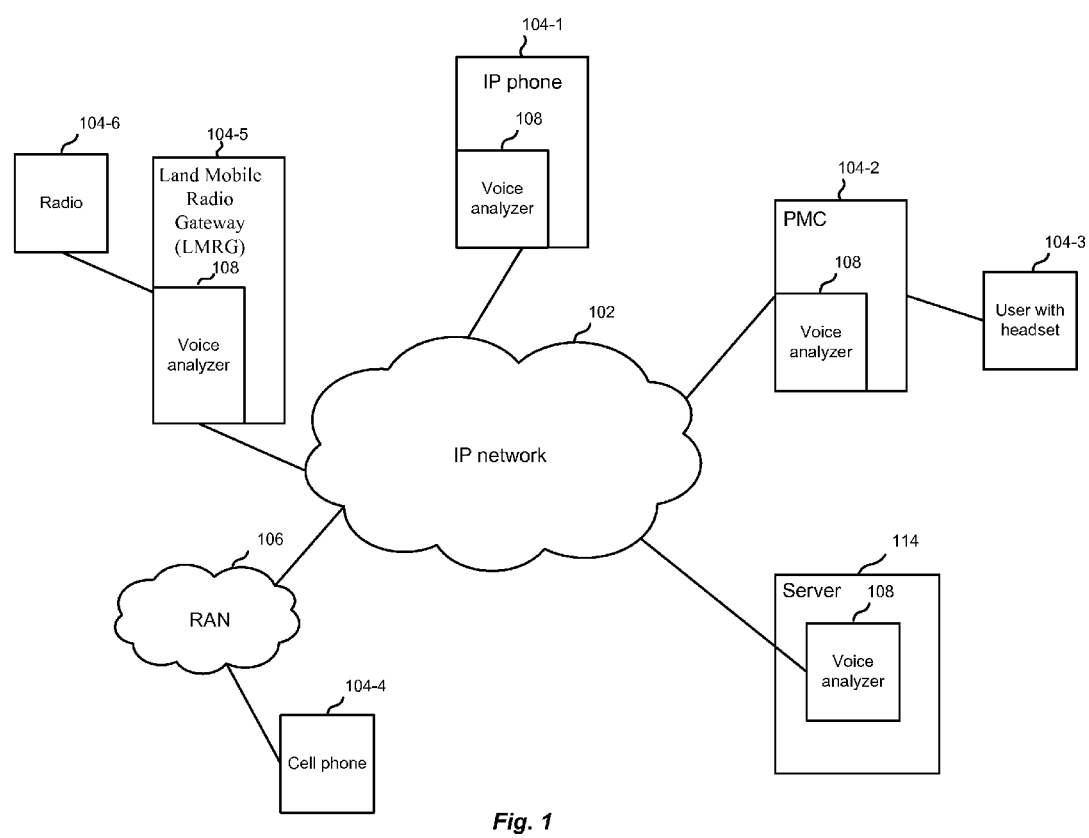
FIG. 1 depicts an example of a system for providing voice quality assurance in voice communication systems.

FIG. 1 depicts an example of a system for providing voice quality assurance in voice communication systems. In one embodiment, a push-to-talk (PTT) system may be provided. The push-to-talk system may be an Internet protocol (IP) interoperability and collaboration system (IPICS) voice communication system. The IPICS voice communication system may send radio traffic over an IP network 102 and enables users to communicate with different types of user devices, such as radios, fixed or mobile telephones, personal computers, etc. In a push-to-talk system, users may indicate an interest in talking. For example, a user may push or select a talk button. That user is then allowed to speak when appropriate (e.g., when other users have not currently requested to talk and have been given permission to talk). All users in the system can then hear what the user is saying. Although a push-to-talk voice communication system is discussed, it will be understood that other communication systems will be appreciated. For example, particular embodiments may be used in mobile phone conversations, video conferencing, etc.

In the voice communication system, various end points 104 may be provided. For example, end points 104 may include not only push-to-talk telephones, but also radio handsets, IP phones, laptop PC clients, PSTN telephones, cell phones, smart phones, etc. As shown, an end point 104-1 is an IP phone and end point 104-2 is a push-to-talk management center (PMC), which includes a headset 104-3 that is operated by a user. PMC may be an application that enables push-to-talk (PTT) functionality for personal computer users. It allows users to communicate over and monitor broadcasts of multiple channels of communications at the office or from a remote site. Also, end point 104-4 is a cellular phone that may connect through a radio access network (RAN) 106. RAN 106 may be any access network for a mobile communications system. End point 104-5 may be a radio device, such as a land mobile radio, which is connected to a land mobile radio gateway (LMRG) 104-5.

Users may communicate with each other in the voice communication system. It is possible that distortion may occur while a user is speaking. Voice quality degradation may occur because of the way the user is speaking into a microphone. If the initial voice signal is distorted at the microphone ingress point, then improvement at the downstream end points 104 is minimal and limited. For example, transmission processing technology, such as automatic gain control (AGC), may improve sound quality under certain circumstances if there is incorrect volume at the analog to digital or digital to analog conversion points in the egress circuitry. Basically, AGC increases or decreases the volume. However, if the initial analog signal is distorted at the microphone ingress point (i.e., where the user is speaking into the microphone), the amount of improvement that can be realized at a downstream signal processing unit is limited. For example, if the signal is distorted at the microphone, then it cannot be substantially improved at an end point 104 receiving the signal.

A voice analyzer 108 is configured to analyze voice signals from a speaker's end point 104. If voice quality degradation is detected, voice analyzer 108 may detect when there is voice quality degradation at an ingress point (e.g., the microphone of the speaker). When voice quality degradation occurs, feedback information for the speaker is generated. For example, feedback information may indicate to a user that some kind of voice quality degradation is occurring and suggest a change or action to take. The feedback information provides information as to how a user can alter the voice signals being input into a microphone. For example, voice analyzer 108 may detect distortions caused by overdriving a microphone and alert the user to move the microphone accordingly. Also, if it is detected that the speaker is talking with the microphone too close to the mouth, the feedback information may indicate to the speaker that the microphone position or input volume be adjusted. Also, a low power signal at the microphone may be detected and alerts the user to speak louder. This may reduce the need for other end points in the conversation to amplify the signal which may produce the undesirable side effect of amplifying the noise. Also, voice analyzer 108 may detect noise caused by the breathing of the end user and alert the user to adjust the microphone accordingly. In another embodiment the system is configured to detect heart beating signals. In case the user clips the microphone in the vicinity of his chest and the microphone picks-up the sound of his beating heart, the user in notified of this event and advised to move the microphone accordingly. In yet another example embodiment the system may be programmed to detect external signals like sound of a projector fan. In the case this signal is detected, the system may advise the user to move the microphone away from the fan.

In one embodiment, the feedback information is directed to only the speaker that is causing the voice quality degradation. For example, the feedback information is output to an end device 104 being used by the speaker. The feedback information may be whispered into an output speaker of end device 104 or any other indication may be provided, such as a series of lights. Also, the feedback information may be sent to other users. For example, an agent or coordinator may want to know who is causing the voice quality degradation and what the cause is. Also, the feedback information may be stored for later analysis.

Once receiving the feedback information, the speaker can make the adjustments. For example, the user may adjust the microphone or how loud he/she is speaking. Thus, voice quality may be improved by suggesting a change before the voice signal ingress point at a microphone.

Voice analyzer 108 may be provided anywhere in the system. For example, voice analyzer 108 may be in an end point 104 being used by a speaker. However, voice analyzer 108 may be found in other components, such as in PMC 104-2, a stand alone voice analyzer 108 (as shown in server 114), etc. Also, voice analyzer 108 may be found in other end points 104 that are receiving signals from a speaker. Voice analyzer 108 analyzes voice signals as output by the microphone of a speaker (even if the voice analyzer is not in the speaker's end device). Thus, the desire is to improve the voice quality at the speaker end.

Figure 2:
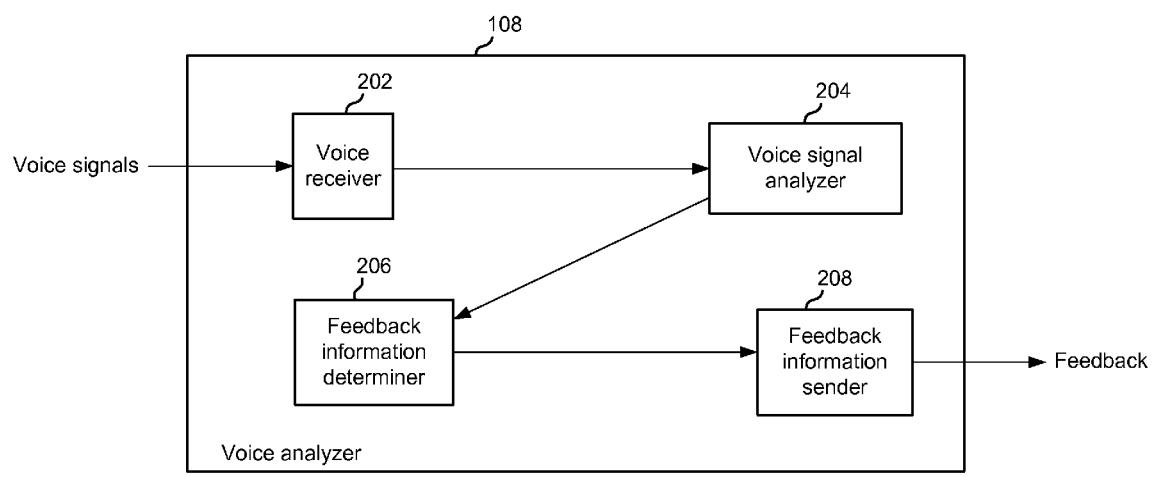
FIG. 2 depicts a more detailed example of voice analyzer.

FIG. 2 depicts a more detailed example of voice analyzer 108. Voice analyzer 108 may include a voice receiver 202, a voice information analyzer 204, a feedback information determiner 206, and a feedback information sender 208.

Voice receiver 202 may receive voice signals. For example, the voice signals may be signals that exit a microphone transducer from end point 104 of a speaker. Particular embodiments want to improve the quality of the initial acoustic to electric conversion performed by the microphone by informing the speaker that the voice quality of their speech can be improved by performing some action. This is when distortion occurs from signals exiting the microphone, which affect other users in the conversation, and cannot be easily corrected at other end points 104. If the signal exiting the microphone transducer is distorted to a point where the voice quality is degraded above a certain threshold, then the speaker may be alerted to this fact. The user may adjust a way of talking to change how the voice is being input into a microphone. This may be useful because if the voice quality is degradated, the voice may be distorted such that it may be annoying or even unintelligible to other users in a single or multi-part conversation.

Voice signal analyzer 204 is configured to analyze the voice signals to determine if the signal is not degraded. For example, signal degradation may be measured in different ways. In one example, voice signal analyzer 204 determines if the signal is within a pre-determined range that is considered to be satisfactory. For example, a central system operator, such as a controller in an emergency response situation, selects thresholds for voice signals, such as an acceptable range of input levels. The input level may be a power level. Also, the dynamic range may be measured, such as a voltage level is measured to determine if it is above a certain level. In one example, a user of end point 104-3 may configure PMC 104-2 with the acceptable range using a pre-defined set of choices. Also, the acceptable range of input levels may be pre-determined by a system setting or configuration.

Voice signal analyzer 204 automatically detects when voice signals are considered degraded. For example, voice signals may be degraded when they violate a threshold or deviate from the acceptable range of input levels. For example, the output of the microphone transducer is analyzed using digital signal processing techniques to determine if voice degradation is occurring. The digital signal processing may analyze the signals to determine if they are degraded. In one example, the voice signal may be too loud, too soft, distorted by physical input such as breathing or excessive sound aspiration of the speaker, too much noise is present, etc. If voice signal analyzer 204 determines that the voice signal is outside the acceptable range, then feedback information determiner 206 is configured to determine feedback for the speaker. In yet another example embodiment, voice signal analyzer 204 employs a frequency spectrum analyzer that is configured to detect microphone saturation due to overdrive of the signals or amplifier based noise due to low voice signal amplification. Also, speech recognition may be used to detect levels of intelligibility in the speech. For example, if a speech recognition engine cannot comprehend a large number of words, the voice signals may be considered degraded.

In one embodiment, non-stationary random processors may be used to filter out human breath bursting as users are under duress and monitor the average speech levels of incoming speech to avoid peak clipping or low volume situations. The random processors are processors capable of dealing with non-random processes. For example, the breath bursts may be detected using pitch detection and the breath bursts can be filtered out. Also, the voice quality (mean opinion score (MOS)) of incoming speech via International Telecommunication Union (ITU) P.563 is predicted to detect pre-microphone saturation that can degrade voice quality substantially. The MOS provides a numerical indication of the perceived quality of voice signals after transmission. The MOS is expressed as a single number in the range 1 to 5, where 1 is lowest perceived quality, and 5 is the highest perceived quality. For example, the MOS may predict how the transmitted voice will sound to a user. If the MOS is below a threshold, such as 2, then the voice signals may be considered degraded.

Voice signal analyzer 204 may use a state machine that uses these techniques to prevent false positive alerting. For example, the state machine may base decisions on a specific set of criteria. For instance if a user is speaking too loud the system can inform the user to speak with less volume by a visual cue; however if after a certain amount of signals to the user to lower his volume and the speaker maintains his volume level, the system can invoke something audible to get the attention of the speaker. Thus, a robust algorithm for detecting near-end distortions is provided.

Different voice quality degradation may require different notifications. The notifications are designed to notify the end-user when he over or under drives the microphone and advise him how to position the microphone in an optimal position with respect to his mouth. For example, if the speaker is speaking too softly, then the feedback information should indicate that the speaker should speak louder. Further, if the speaker is speaking too closely to the microphone, then it is determined that the feedback information should be that the speaker should adjust the microphone to be farther away.

The feedback information may be a set of pre-defined notifications, such as pre-recorded voice notifications may be provided. Additionally, other feedback information may be used, such as different patterns of lights may be illuminated to notify the user to take different actions.

When the feedback information is determined, feedback information sender 208 outputs the feedback information to the speaker. In one embodiment, only the speaker is notified and not the other users in the conversation. In one example, the feedback information may be played or whispered into a speaker's output speaker, such as the user's ear piece. For example, a pre-recorded message may tell the speaker to move away from the microphone, to speak more softly, move closer to the microphone, or speak more loudly. Further, illuminated signal lights may provide the feedback information. For example, different lights may be lit up to indicate that a user should speak more loudly or softly. Other methods may be appreciated, such as using multimedia methods, such as a display, short message service (SMS) message, instant messaging (IM), etc.

Once receiving the feedback information, the speaker can adjust the way he/she is talking. This may improve the voice quality in the communication. Thus, this alleviates any other user in the conversation from having to tell the speaker that they cannot understand him/her. Further, automatic detection of voice quality degradation is provided and thus may be very efficient in alerting a user of the feedback information. That is, the voice quality degradation may be detected quickly and thus avoids the speaker continuing to talk for a long time before being notified by another user. This may be critical in emergency situations when a speaker may not be able to freely talk and repeat what he/she has said.

Figure 3:
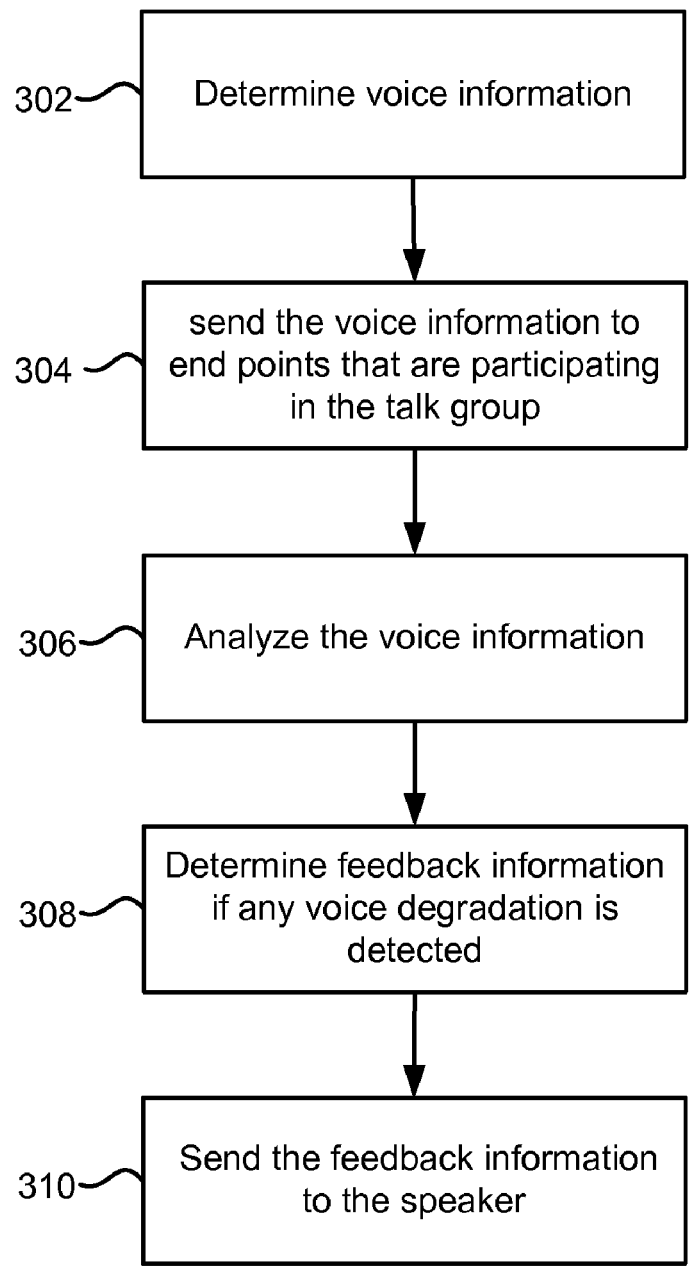
FIG. 3 depicts a simplified flow chart of a method for determining feedback information.

FIG. 3 depicts a simplified flow chart of a method for determining feedback information. Step 302 determines voice information. For example, voice signals may be received from a microphone.

Step 304 may send the voice information to end points 104 that are participating in the talk group. For example, the voice information is sent in real-time to other participants in the conversation. In addition, the following analysis is performed. In other embodiments, the voice information may be queued until the analysis may be performed.

Step 306 analyzes the voice information. For example, the voice information is analyzed to see if any voice quality degradation, such as distortion, is evident.

Step 308 then determines feedback information if any voice quality degradation is detected. The feedback information determined is applicable to the type of voice quality degradation that is determined and attempts to correct the problem, thus raising voice quality. For example, intelligence is provided in that if it is determined that a user is speaking too softly, the feedback information should tell the user to speak more loudly. Similarly, if the system detects that the user is breathing into the microphone, the user is advised to move the microphone to a place wherein it does not pick-up the sound of his breathing.

Step 310 then sends the feedback information to the speaker. For example, the feedback information may be output to the speaker. Also, if the voice analysis was performed in a device other than the end device being used by the speaker, then the feedback information is sent to the speaker's end device, which may then output the feedback information.

Figure 4:
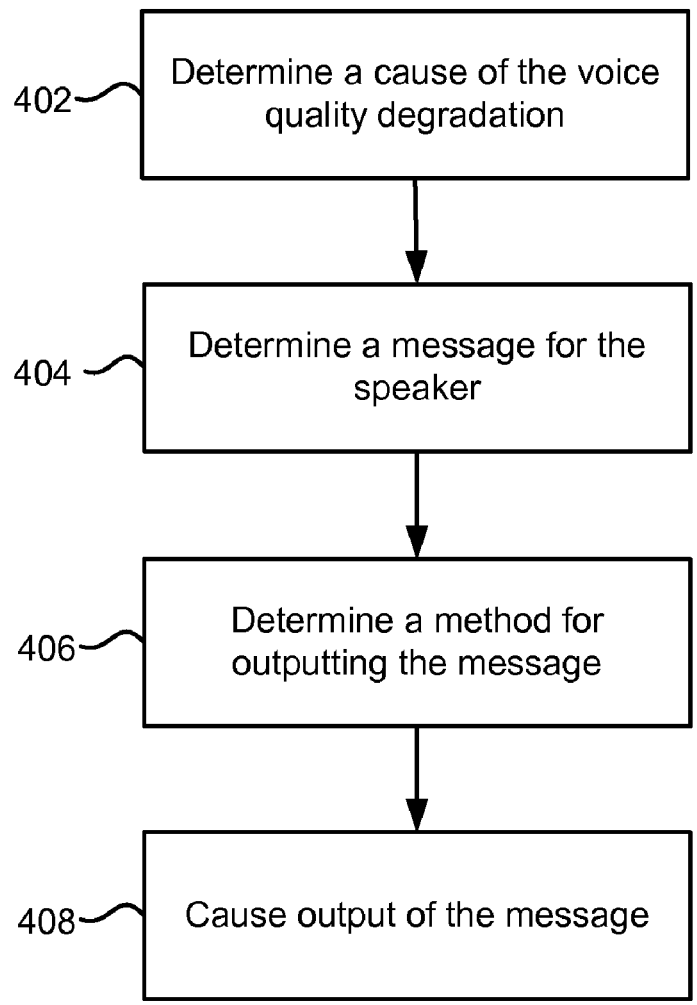
FIG. 4 depicts a simplified flow chart of a method for analyzing the voice information.

FIG. 4 depicts a simplified flow chart of a method for analyzing the voice information. Step 402 determines a cause of the voice quality degradation. There may be many reasons for voice quality degradation.

Step 404 determines a message for the speaker. The message may be determined by the kind of voice quality degradation that is detected. The message may be pre-recorded or may be generated dynamically. For example, depending on the level of voice quality degradation, the speaker may be told to move the microphone a certain amount in a certain direction.

Step 406 then determines a method for outputting the message. For example, particular embodiments may analyze the type of end point 104 a speaker is using. Then, the method of outputting is determined. Further, if the situation a user is experiencing in is known, then that situation may be taken into account. For example, if the user indicates they are in a situation where any noise may be detrimental, then lights may be illuminated instead of playing a message in the user's output speaker.

Step 408 then causes output of the message. For example, if voice analyzer 108 is found in end point 104, then the message is output at end point 104. If voice analyzer 108 is found outside of end point 104, then the message may be sent through network 102 or through other methods to end point 104. End point 104 can then output the message.

Although the description has been described with respect to particular embodiments thereof, these particular embodiments are merely illustrative, and not restrictive. Although PTT systems are described, it will be understood that other voice communications systems may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that which is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
    analyzing voice information for an end point device in a voice communication system-to determine that quality of the received voice information is degraded, wherein analyzing the voice information includes identifying, from a plurality of types of degradation, a particular type of degradation of the received voice information;
    determining, using the communication system, feedback information, in response to the determination that the quality of the voice information is degraded, the feedback information based at least in part on the identified particular type of degradation, and adapted to indicate, to a user of the end point device, that the quality of the voice information is degraded and communicate, to the user of the end point device, a recommendation for remedying the particular type of degradation; and
    causing output of the feedback information at the end point device to the user using the end point device.

2. The method of claim 1, wherein causing output of the feedback information comprises causing output of the feedback information in an output speaker of the end point device.

3. The method of claim 1, wherein causing output of the feedback information comprises causing output of the feedback information as a visual output on the end point device.

4. The method of claim 1, wherein analyzing the voice information comprises:
    comparing the voice information to a threshold; and
    determining if the voice information violates the threshold.

5. The method of claim 1, wherein determining the feedback information and causing output of the feedback information is performed in the end point device of the user.

6. The method of claim 1, wherein the voice information comprises voice data output by a microphone of the end point device being spoken into by the user.

7. The method of claim 1, wherein the identified type of degradation includes
- detected breathing sounds or heart beating sounds of the user speaking, wherein the feedback information communicates a recommendation indicating a repositioning of a microphone to remedy the detected breathing sounds or heart beating sounds.

8. The method of claim 7, wherein the identified type of degradation includes a detected overdriven or underdriven voice signal, wherein the feedback information communicates a recommendation indicating a repositioning of a microphone to remedy the detected overdriven or underdriven voice signal.

9. The method of claim 1, wherein the voice communication system is a push to talk voice communication system.

10. The method of claim 1, wherein determining the feedback information comprises generating the feedback information based on the analysis.

11. The method of claim 1, wherein the voice information is analyzed at the end point device.

12. The method of claim 1, wherein the feedback information is determined at the end point device.

13. The method of claim 1, further comprising:
- analyzing second voice information received at the end point device to determine that quality of the second voice information is degraded, wherein analyzing the second voice information includes
  - identifying, in the second voice information, another type of degradation in the plurality of types of degradation;
  - determining second feedback information in response to determining that the quality of the second voice information is degraded, the second feedback information based at least in part on the identified other type of degradation, and
  - adapted to indicate, to a user of the end point device, that the quality of the second voice information is degraded and communicate, to the user of the end point device, a second recommendation for remedying the other type of degradation,
  - wherein the second recommendation is different from the recommendation for remedying the particular type of degradation; and
- causing output of the second feedback information at the end point device to the user of the end point device.

14. The method of claim 1, wherein determining the feedback information includes dynamically generating the feedback information based at least in part on the type of degradation identified in the received voice information.

15. The method of claim 1, further comprising detecting a type of the end point device, wherein the feedback information is further based on the detected type of end point device.

16. The method of claim 1, wherein the voice information is transmitted to one or more other end point devices in the voice communication system, and the feedback information is presented so as to be silent to users of the one or more other end point devices.

17. The method of claim 16, further comprising predicting that presenting audible feedback information would be heard by at least one of the other end point devices while the end point device operates in a particular operational environment, wherein visual feedback information is determined in response to determining that the quality of the voice information based at least in part on predicting that audible feedback information would be heard by other end point devices when output at the end point device while the end point device operates in the particular operational environment.

18. The method of claim 1, wherein the determined feedback information is first feedback information, the method further comprising:
- detecting that the identified particular type of degradation was not remedied following output of the first feedback information; and
- causing output of second, different feedback information at the end point device to the end point device user in response to the detecting that the identified particular type of degradation was not remedied, the second feedback information repeating the recommendation.

19. The method of claim 1, wherein the feedback information further communicates, to the user of the end point device, the identified particular type of degradation.

20. An apparatus comprising:
- one or more processors; and
- logic encoded in one or more tangible media for execution by the one or more processors and when executed operable to:
  - analyze voice information received at an end point device in a voice communication system to determine that quality of the received voice information is degraded, wherein analyzing the voice information includes identifying, from a plurality of types of degradation, a particular type of degradation of the received voice information;
  - determine feedback information, in response to the determination that the quality of the voice information is degraded, the feedback information based at least in part on the identified particular type of degradation, and adapted to indicate, to a user of the end point device, that the quality of the voice information is degraded and communicate, to the user of the end point device, a recommendation for remedying the particular type of degradation; and
  - cause output of the feedback information at the end point device to the user using the end point device.

21. The apparatus of claim 20, wherein the logic when executed is further operable to cause output of the feedback information in an output speaker for the end point device.

22. The apparatus of claim 20, wherein the logic when executed is further operable to cause output of the feedback information as a visual output for the end point device.

23. The apparatus of claim 20, wherein the logic operable to determine the feedback information and send the feedback information is provided in a device other than the end point device being used by the user.

24. The apparatus of claim 20, wherein the apparatus includes the end point device.

25. An apparatus comprising:
- means for analyzing voice information received at an end point device in a voice communication system to determine that quality of the voice information is degraded, wherein analyzing the voice information includes identifying, from a plurality of types of degradation, a particular type of degradation of the received voice information;
- means for determining feedback information, in response to the determination that the quality of the voice information is degraded, the feedback information based at least in part on the identified particular type of degradation, and adapted to indicate, to a user of the end point device, that the quality of the voice information is degraded and communicate, to the user of the end point device, a recommendation for remedying the particular type of degradation; and means for causing output of the feedback information at the end point device to the user using the end point device.

* * * * *